(12) United States Patent
Khanna

(10) Patent No.: US 7,819,997 B2
(45) Date of Patent: Oct. 26, 2010

(54) TRANSPARENT COMPOSITES AND LAMINATES AND METHODS FOR MAKING

(75) Inventor: Sanjeev K. Khanna, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 1258 days.

(21) Appl. No.: 10/943,335

(22) Filed: Sep. 17, 2004

(65) Prior Publication Data

US 2006/0063880 A1   Mar. 23, 2006

(51) Int. Cl.
B29C 65/00 (2006.01)
B32B 17/00 (2006.01)
B32B 17/06 (2006.01)

(52) U.S. Cl. .......................... 156/99; 428/426; 523/168
(58) Field of Classification Search .................. 156/99; 428/426; 523/168
See application file for complete search history.

(56) References Cited

U.S. PATENT DOCUMENTS

| | | | | |
|---|---|---|---|---|
| 2,944,994 A | * | 7/1960 | Singieton et al. ............ 523/513 |
| 3,089,801 A | * | 5/1963 | Tierney et al. .............. 428/332 |
| 3,508,987 A | * | 4/1970 | Folk et al. ...................... 156/99 |
| 5,039,566 A | | 8/1991 | Skubic et al. | |
| 5,665,450 A | | 9/1997 | Day et al. | |
| 5,910,522 A | * | 6/1999 | Schmidt et al. ............. 523/168 |
| 6,329,058 B1 | * | 12/2001 | Arney et al. ................ 428/403 |

FOREIGN PATENT DOCUMENTS

JP    2004191734    *   8/2004

OTHER PUBLICATIONS

Hashimoto et al., Patent Abstracts of Japan JP 2004-191734, "Plastic Substrate, and Liquid Crystal Display Device Provided With the Same," Aug. 2004.*
Hashimoto et al., Machine translation of JP 2004-191734, Aug. 2004.*
Dave et al. Processing of Composites, 2000, Hanser Publishers, p. 34.*
http://en.wikipedia.org/wiki/Refractive_index, 2009.*

* cited by examiner

*Primary Examiner*—Justin Fischer
(74) *Attorney, Agent, or Firm*—Greer, Burns & Crain Ltd.

(57) ABSTRACT

An exemplary method for making a transparent composite includes steps of combining a refractive index modifier with a precursor solution, combining glass with the precursor solution, and curing the precursor solution to create a transparent glass reinforced polymer composite. An exemplary transparent composite comprises a glass reinforced thermosetting polymer composite layer sandwiched between glass layers.

8 Claims, 2 Drawing Sheets

TRANSPARENT COMPOSITES AND LAMINATES AND METHODS FOR MAKING

STATEMENT OF GOVERNMENT INTEREST

This invention was made with Government assistance under National Science Foundation Grant No. NSF 0196428. The Government has certain rights in the invention.

FIELD OF THE INVENTION

A field of the invention is methods for making transparent composites and laminates. Another field of the invention is transparent composites and laminates.

BACKGROUND

Although glass is the most common transparent material used in buildings, vehicles, and the like, glass is not acceptable for all such applications. Glass is relatively heavy and brittle, and may shatter into a multiplicity of sharp parts when impacted. These properties make glass disadvantageous for many applications, including some building and vehicle windows. Additionally, glass is difficult to form into complex shapes.

For many applications in which the potential for impact or other strains and/or stresses exist, there exists a general need for mechanically strong composite materials that are of high optical quality and have an optical transparency similar or equivalent to that of glass. Polymers such as polymethylmethacrylate (PMMA), sold under the trademark PLEXIGLASS, are used in place of glass in certain applications in which both impact resistance and optical transparency are required. Unfortunately, thermoplastic polymers such as PMMA still do not have sufficient mechanical strength for many current applications.

One method of increasing the mechanical strength of polymers like PMMA is to reinforce them with strong glass fibers. This technology is practiced in the manufacture of fiberglass-reinforced plastics (FRP). In most cases, however, the introduction of glass fibers into an optically transparent polymer limits or destroys the transparency of the polymer. Commercial FRP composites presently produced are either optically opaque or translucent such that an object at distances greater than about a few feet cannot be clearly seen through them, and/or significant distortions occur.

Among the problems that exist in the aforesaid glass fiber/thermoplastic polymer composites is that changes in the temperature of such composites can cause the relative refractive indices of the glass fibers and polymer to change relative to one another such that they become mismatched. While the impact resistance of a thermoplastic polymer may be better than that of glass, its strength is lower. The stiffness of the thermoplastic polymer can also be undesirable for some applications. Finally, the thermoplastic polymer tends to degrade quickly with increasing temperature. This mismatching results in degraded composite clarity and/or transparency. This lack of clarity with temperature change means that glass fiber-reinforced transparent composites lose clarity when used in anything except for a narrow range of temperatures. Also, even within a limited temperature range, the clarity of glass fiber-reinforced composites may be noticeably less than that of glass. This is unacceptable for applications such as use for home or building windows.

As a result of these and other problems, unresolved needs remain in the art.

SUMMARY OF THE INVENTION

An exemplary method for making a transparent composite includes steps of combining a refractive index modifier with a polymer precursor solution, combining glass with the precursor solution, and curing the precursor solution to create a transparent glass reinforced polymer composite. An exemplary laminate includes a glass reinforced thermosetting polymer composite bound to glass layers.

DESCRIPTION OF THE EXEMPLARY EMBODIMENTS

Before describing exemplary embodiments of the invention in detail, it will be appreciated that the present invention includes transparent laminates, transparent composites, and methods for making the same. Accordingly, it will be understood that in describing methods of the invention for making transparent laminates and composites, description is likewise being made of transparent composites and laminates of the invention.

Figure 1:
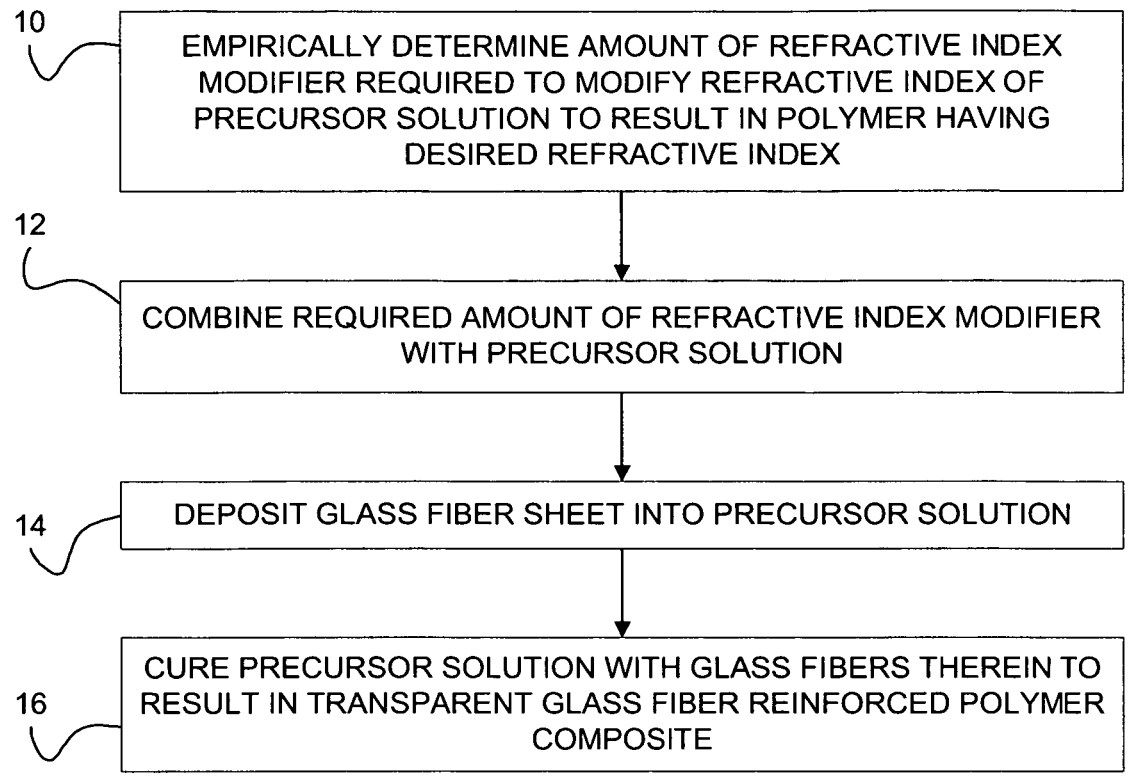
FIG. 1 is a flowchart illustrating exemplary steps of a method of the invention.

FIG. 1 is a flowchart illustrating steps of one exemplary method of the invention. An exemplary method for making a transparent composite 10 includes a step of empirically determining the amount of a refractive index modifier to add to a precursor solution to result in the precursor solution having a desired refractive index when cured into a polymer (block 10). As used herein, the term "refractive index modifier" is intended to broadly refer to any material useful to modify the refractive index of a material, and the terms "precursor solution" and "polymer precursor solution" are intended to broadly refer to a solution capable of being polymerized. A precursor solution, for example, may be a solution containing a monomer, carrier or solvent, some polymer, un-saturated polymer, polymer dissolved in monomer solution, and/or additional materials. A precursor solution may also be substantially pure liquid monomer. It will be appreciated that the terms "polymer precursor solution" and "precursor solution" may be used interchangeably herein.

The polymer precursor solution preferably contains a monomer or un-saturated polymer that will be cured into a thermosetting polymer as opposed to material(s) that will polymerize into a thermoplastic polymer. Thermosetting polymers are preferred since they have a greater strength and stiffness than thermoplastics and do not degrade with increasing temperature as thermoplastics do. The polymer that results from curing is also transparent. Exemplary precursor solutions include esters, ethylenes, acrylics, vinyls, epoxies, urethanes and mixtures of the same. One exemplary precursor that has proven useful in practice of the invention contains unsaturated polyester ($-(CH_2=CHRCO)_n-$), available commercially, for instance, from Ashland Chemical Co, Dublin, Ohio.

Exemplary refractive index modification is possible by adding a polymer(s) that has a higher or lower refractive index than the candidate host polymer to respectively raise or lower its refractive index. The refractive index modifier should also be compatible with the host polymer to prevent phase segregation or other effects that could lead scattering of light in the resultant polymer. Another example refractive index modifier is any chemical(s) that alters the crystallinity or density or the polarizable electrons per unit volume of the host polymer. Chemicals that increase these properties can be used to increase the refractive index of the host polymer, and chemicals that decrease these properties can be used to decrease refractive index of host polymer.

Fluorinated polymers are examples of chemicals that increase refractive index, while chlorinated polymers are examples of chemicals that decrease the refractive index. When practicing the invention using a precursor solution containing an ester monomer or unsaturated polymer, exemplary refractive index modifiers include divinyl benzene and or di-butyl phthalate. Another exemplary refractive index modifier believed to be useful to raise the refractive index of polyester is a polycarbonate resin.

In addition to chemicals, it has been discovered that nanoparticles are a suitable refractive index modifier for practice of the invention. Nanoparticles with a diameter that is less than that of visible light do not have a noticeable effect on the transmission of the visible light through the transparent polymer. Visible light has a wavelength of between about 400-700 nm. Accordingly, it is preferred that nanoparticles used in methods of the invention as a refractive index modifier have a diameter of less than about 400 nm, and more preferably of less than about 200 nm. Nanoparticles may also be desirable since they can be used to introduce other functionalities in addition to increasing mechanical strength, such as reflecting short wavelength ultra-violet light. Substantially platelet shaped, cylindrical shaped, and other shaped nanoparticles may be used. Nanoparticles may be made of metal oxides such as titanium oxide and/or titanium dioxide, ceramics, in addition to other suitable materials.

Nanoparticles that have a refractive index greater than the host polymer will increase the refractive index of the polymer, and vice versa. By way of example, titanium dioxide nanoparticles have a refractive index greater than polyester. They may therefore be used in a method of the invention as a refractive index modifier to increase the refractive index of a polyester that results from the curing of a polyester precursor solution. Nanoparticles used as refractive index modifiers should also be selected to insure that other properties of the polymer are not adversely affected, with an example adverse effect being a reaction with the polymer over time.

The step 10 of empirically determining the amount of the refractive index modifier, whether it be a chemical solution, nanoparticles, or another modifier, to combine with the precursor solution may include determining a desired refractive index, adding a first amount of modifier to the precursor solution, curing the solution, and determining the refractive index of the polymer that results. This sequence of steps may then be repeated using a lesser or greater relative amount of modifier based on the result of the first iteration. After from a few to several iterations of this sequence, a suitable ratio of modifier can be determined that results in the refractive index of the final polymer having a desired value. By way of example, it is believed that between about 0.5% to about 3% by weight (based on total weight of final solution) of titanium dioxide or other titanium nanoparticles may be a useful amount to add to a precursor solution that will cure to a polyester polymer.

The desired value of the refractive index is preferably substantially equal to the refractive index of the glass fibers that will be combined with the precursor solution. This refractive index may be determined by experiment, or, more preferably, is obtained from literature. For example, a reported refractive index for E-glass fibers is 1.55, and for S-glass fibers is 1.52. It is preferred that the polymerized precursor solution have a refractive index that substantially matches the refractive index of the glass fibers. This results in minimal to no noticeable distortion when images are viewed through the final transparent glass reinforced polymer composite. Refractive indexes that are at least within about 1% of one another are preferred, although indexes that are within about 2% of one another are believed to perform satisfactorily. Most preferably, the refractive index of the polymer substantially equals that of the glass fibers, or is at least within about 0.5%. It is believed that refractive indexes that differ from one another by more than about 10% result in an unacceptable level of distortion.

In the exemplary method, a required amount of refractive index modifier is combined with the precursor solution so that the solution, when cured into a polymer, has the desired refractive index (block 12). This may occur, for example, by combining divinyl benzene or polycarbonate resin, or titanium oxide/dioxide nanoparticles with the precursor solution while the precursor solution is contained in a container such as a mold. Mixing may be provided to achieve suitable distribution.

The exemplary method next includes a step of depositing a glass fiber sheet into the precursor solution in the container (block 14). The glass fiber sheet may include any suitable silica based glass fibers, with E-glass fibers, S-glass fibers, A-glass fibers, AF-glass fibers, C-glass fibers, being some examples. The fibers should be transparent and have good tensile strength. S-glass is an example of a glass fiber that offers relatively high tensile strength. Although E-glass fibers have slightly lower mechanical properties, they are typically commercially available at a significantly lower cost than S-glass fibers.

Substantially continuous fibers may be used, as well as shorter fibers. Fibers that are too short may result in a less than desirable mechanical strength. It is believed that fibers having a length of at least about 50, and more preferably at least about 100 times their diameter provide good mechanical strength. In many applications substantially continuous fibers that have a length the same or greater than the size of the transparent composite will prove beneficial. As used herein, the term "continuous fiber" when used in this context is intended to be broadly interpreted as having a length that is close to or greater than the length of the composite being made. For example, when practicing a method of the invention to make a transparent composite having a length of about 18", fibers of about 18" may prove useful. The fibers then may be placed so that they run continuously across the length of the composite.

The fibers may be thick enough to provide a desired degree of strength, but not so thick that they are overly stiff and relatively brittle. Diameters of between about 10 and about 25 micrometers are believed to be suitable, although practice of the invention using other diameters is also contemplated. Nano-fibers may be useful. When the precursor solution is contained in a container such as a mold, the fiber sheet may be deposited onto the surface of the solution. Preferably substantially all of the fibers become wetted with the precursor solution.

The present invention contemplates use of glass fibers in forms other than sheets of fibers. Loose fibers may be used, for example, in a variety of diameters, lengths, orientations, and the like. Glass in other forms, including a substantially planar and flexible ribbon, is also contemplated for use in addition to or as an alternative to glass fibers. For many applications, glass fibers will be preferred over ribbon because fiber's three-dimensional orientation can be advantageous to contribute mechanical strength in multiple directions.

Glass is preferably provided, regardless of whether it be in fiber, ribbon or other form, in an amount so that the final volume ratio of the glass is between about 15-30%. Referring in particular to fiber, it is believed that a 50% maximum fiber volume ratio is a useful upper limit as above this fiber fraction the amount of polymer will be low which may affect bonding with the fibers and cause loss of transparency. Too low of a fiber volume percentage may result in a final composite of limited mechanical strength. It is believed that a minimum fiber volume ratio of about 10% is useful to achieve significant mechanical strength advantages of the fibers, although lower content is contemplated and may be useful for some applications.

The amount of fiber, fiber length, fiber diameter, fiber orientation, and the fiber entanglement are variables that may be altered to affect the strength and flexibility of the final glass reinforced polymer composite. For example, the angle of orientation of fibers may be varied to alter the strength of the final composite in a particular direction. In some methods of the invention, entangled fibers are provided in sheets with a generally random and equally distributed orientation. In other methods of the invention, fibers may be provided in only the X direction, crossed in both the X and Y direction, and in other angular variations as may be desirable for a particular application.

Some invention embodiments further include steps of coating the glass fibers with a coupling agent to enhance binding with the polymer that will result when the precursor solution is cured. For example, a silane coupling agent may be coated on the glass fibers. Silane coupling agents are known to improve the adhesion between glass fibers and polyester, for example. Silane coatings developed for glass fibers typically have an alkoxy moiety attached to the silica group that interacts well with glass to provide a hydrophobic bond, and a functionalized endgroup that reacts with the polymer to form a covalent bond. Other suitable coupling and binding agents may be selected based on the polymer used and other considerations.

The precursor solution with the glass fibers therein is then cured to result in a transparent glass reinforced polymer composite (block 16). Curing may occur through polymerization by application of heat, a chemical initiator and/or an accelerator. It may be desirable in some applications to avoid the use of heat and pressure. In such cases, polymerization may be accomplished by addition of a chemical initiator and allowing the reaction to occur at room temperature over a period of time that may range from several hours up to a few days. By way of example, MEKP (methyl ethyl ketone peroxide), available commercially from Aldrich Chemical Co., may be added as an initiator when using an unsaturated polyester precursor solution. Those knowledgeable in the art will appreciate that the amount of initiator required may be empirically determined, or may be obtained by reference to literature. When practicing the method using unsaturated polyester, for example, about 1.2% by weight MEKP may be useful. Accelerators, such as cobalt octoate or cobalt napthanate, may also be added if desired to speed the reaction.

Polymerization results in the glass fibers being encapsulated and bound to the polymer. A transparent glass reinforced polymer composite results that combines the transparency of glass, the flexibility of the polymer and a dramatically enhanced mechanical strength due to the presence of the glass fibers. The glass reinforced polymer composite preferably has sufficient flexibility so that it can withstand relatively high impacts concentrated in small areas without breakage or shattering. These and other properties make composites made through methods of the invention suitable for a wide range of applications, with examples including vehicle windshields, impact-proof or resistant transparent composites, hurricane glass, airplane and ship glass, portable electronics display glass, and the like.

In other embodiments of the invention, subsequent steps may include making additional glass reinforced polymer composite layers through the steps of FIG. 1 or other methods and combining these to form a multi-layer composite. The various glass reinforced polymer composite layers may be prepared separately and bound together using a binding agent or other method, or may be formed one on top of another. That is, a precursor solution may be deposited on the first glass reinforced polymer composite, mixed with a refractive index modifier, and a fiber sheet deposited therein. This solution can then be cured to create a second glass reinforced polymer composite layer overlying the first.

Different numbers of layers may be combined to suit different applications. Typical final composites may have varying thickness, with 1-3 mm being exemplary, although other thicknesses are contemplated. By way of particular example, a 7-9 layer composite may have a thickness of about 3 mm. Other thickness' are of course possible within practice of the invention, and may be desirable depending on application. It is noted that any difference between polymer and glass fiber refractive indexes will cause increasing light scattering with increasing layers, so the benefits of having closely matching refractive indexes are increased with increasing layers.

Methods of the invention may include practicing steps of the invention in a shaped mold so that the resulting transparent glass reinforced polymer composite has a desired shape. Desired shapes and final composites may be, by way of example and not limitation, substantially flat plates; curved, arched, or otherwise shaped window panes; vehicle windows such as curved windshields; and the like. The resultant composites may have substantially planar surfaces, or may even have undulating surfaces as may be desired for particular applications. Methods of the invention may likewise include steps of cutting the glass reinforced polymer composite to achieve a desired shape, polishing the composite, and other post formation steps.

Figure 2:
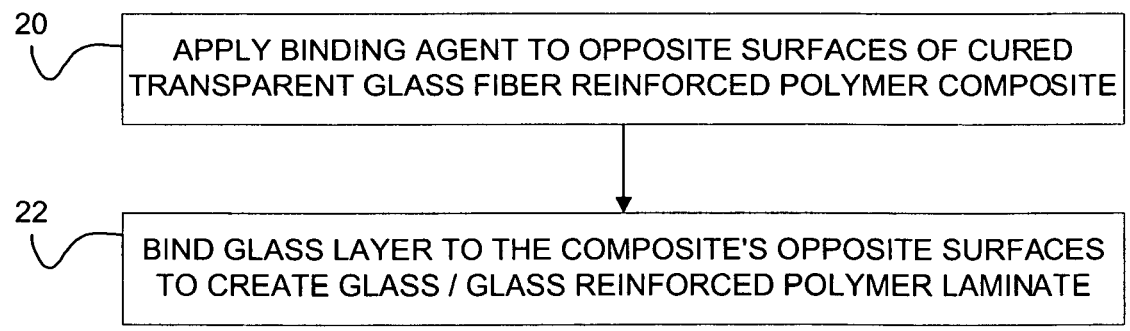
FIG. 2 is a flowchart illustrating additional exemplary steps of a method of the invention.
Figure 3:
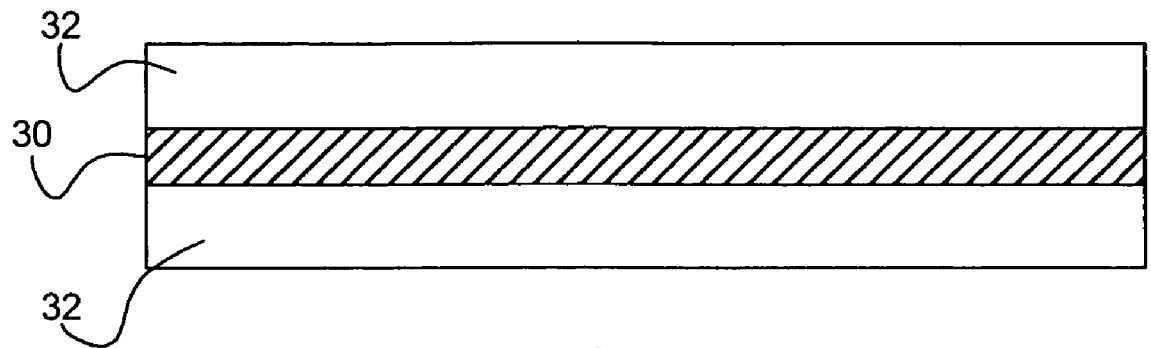
FIG. 3 is a schematic cross section of an exemplary laminate that results from practice of a method of the invention.

Other methods of the invention may include additional steps of binding a glass layer to a glass reinforced polymer composite made through steps of an invention embodiment such as that illustrated in FIG. 1. FIG. 2 is a flow chart illustrating exemplary additional steps. It will be understood that the present invention includes the transparent laminate that results from the steps of FIG. 2 in addition to other transparent laminates. Referring now to FIG. 2, a coupling agent such as a silane is applied to at least one surface of a glass reinforced polymer composite (block 30) that may be made, for example, through the steps of FIG. 1 or another method of the invention. A glass layer is then bound to the surface (block 32) to create a glass/glass reinforced polymer laminate. A coupling agent, with a silane being an example, may also be applied to the glass layer surface. A glass layer may also be bound to an opposite surface of the glass reinforced polymer composite to create a three layer composite. FIG. 3 is a schematic cross-section of such a laminate, with the glass fiber composite layer 30 sandwiched between the glass layers 32. Embodiments of the invention include the laminate of FIG. 3 (and that of FIG. 4) as well as other transparent laminates made through methods of the invention.

The glass layers 32 are preferably selected to have a refractive index that closely matches (e.g., within about 2%), or is preferably substantially equal to, the refractive index of the glass fibers in the glass reinforced polymer composite layer 30. The binding agent applied to the opposite surfaces of the glass reinforced polymer composite layer 30 may be any that is suitable for use with a thermosetting polymer that forms the layer 30, with silane coupling agents being one example. Use of this and other suitable binding agents in combination with use of the thermosetting polymer of the layer 30 allows the layers 30 and 32 to be bound at room temperature and pressure. Methods of the invention thereby realize cost and effort savings in the production of laminates such as those shown in FIGS. 3 and 4. The thicknesses of the layers 30 and 32 may vary depending on application design considerations, with useful ranges believed to be between about 1 and about 3 mm for the glass reinforced polymer composite layer 30 and between about 1 and about 6 mm for the glass layers 32. The glass layers 32 can be any suitable glass, with plate glass, heat strengthened glass or tempered glass being examples. The glass layers may be in the form of substantially planar sheets, or in other forms.

Figure 4:
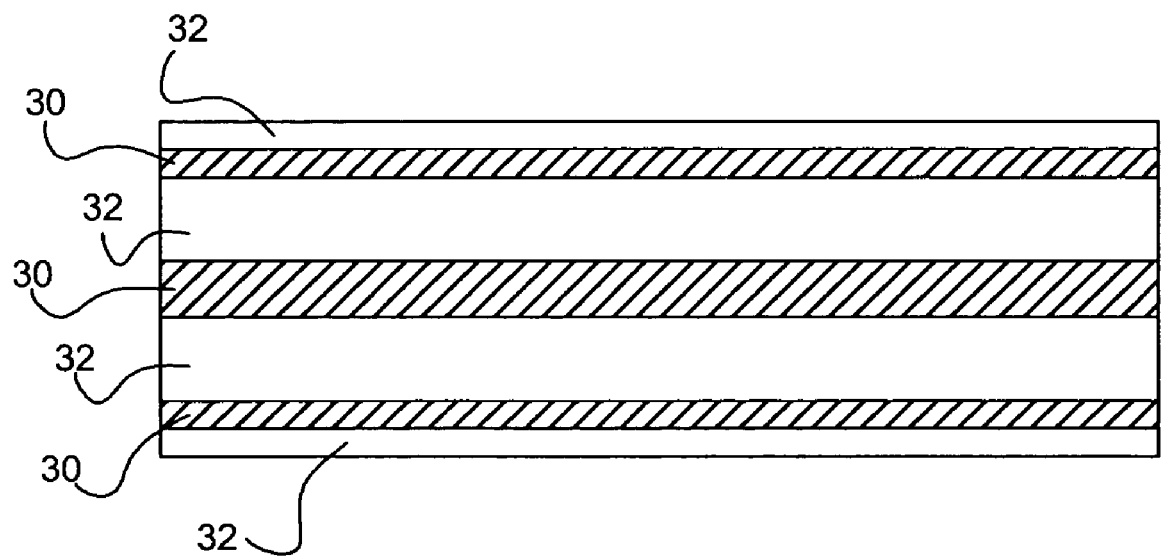
FIG. 4 is a schematic cross section of a second exemplary laminate that results from practice of a method of the invention.

It will be appreciated that although methods for making a two-layer and a three-layer laminate have been discussed, other methods of the invention will result in laminates with more than three layers. More layers may result in enhanced strength and impact resistance, for example. Methods of the invention, for example, may include additional steps of binding a glass reinforced polymer composite layer 30 onto one of the glass layers 32 of FIG. 3, binding an additional glass reinforced polymer layer 32 onto the new composite layer 30, and so on to result in a multi-layer composite having desired strength and/or other qualities. FIG. 4 is a schematic cross section of such a laminate. As illustrated, the layers may be of varying thicknesses. Also, it will be appreciated that the glass reinforced polymer composite layer 30 may comprise a plurality of individual composites bonded together.

Laminates made through methods of the invention and laminates of the invention, with those illustrated in FIGS. 3 and 4 being examples, are believed to provide substantial strength in combination with a transparency and appearance that is generally consistent with that of glass. Methods of the invention that result in these and similar laminates are therefore believed to provide important benefits and advantages that will be valuable in applications that include vehicle and building windows in addition to many others.

In order to further describe exemplary embodiments of the invention, description of an experimental method and laminate of the invention is provided. A 2.5 mm transparent glass reinforced polymer composite was prepared according to a method consistent with that described in FIG. 1 above using a polyester precursor solution. It had a glass fiber volume fraction of about 18%, an elastic modulus of about 6.7 Gpa, and shear modulus of about 1.15 GPa.

Glass layers were then bonded to opposing surfaces of the glass reinforced polymer composite according to the steps of FIG. 2. The glass layers were between about 3 and about 6 mm thick. A thin layer of polyester resin was applied to each of the two surfaces of the transparent glass reinforced polymer composite, which was then sandwiched between the two glass layers under a nominal pressure. The system cured into an integrated laminated panel after 24 hours. The resultant laminate was highly impact resistant and could withstand, for example, the impact of debris during high speed wind storms such as hurricanes. The resultant laminate also showed clarity comparable to glass.

To estimate its impact resistance, the following impact tests were performed on 450 mm×300 mm×9 mm laminated composite glass panels sections of the experimental laminate clamped on all four sides between silicone rubber glazing:

| Impactor type | Impact velocity | Number of impacts | Damage |
|---|---|---|---|
| 2 gm spherical nosed steel | 270 mph | 25 | None |
| 2 gm spherical nosed steel | 160 mph | 100 | Shattered front glass layer |
| 100 gm metal impactor with wooden front end | 75 mph | 10 | None |
| 100 gm metal impactor with wooden front end | 95 mph | 10 | None |

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims. For example, while exemplary methods of the invention have been described herein as including steps in a particular sequence, it will be understood that methods of the invention are not be limited to these particular sequences, and that other methods of the invention may be practices using the same or similar steps in an alternate sequence. It will also be understood that the present invention includes transparent laminates and composites in addition to methods for making the same, and that description of a method made herein is likewise description of an article of the invention that may be made through the method.

Various features of the invention are set forth in the appended claims.

The invention claimed is:

1. A method for making a laminate including at least a glass layer and a transparent composite comprising the steps of:
   making at least one transparent glass reinforced polymer composite through steps comprising:
   combining a refractive index modifier with a polymer precursor solution;
   combining glass with said precursor solution to result in a glass concentration of between about 10% and 50% by volume; and,
   curing said precursor solution to create a transparent glass reinforced polymer composite; and,
   binding a glass layer to said transparent glass reinforced polymer composite to form the laminate, said glass layer having a refractive index substantially equal to the refractive index of said glass with said precursor solution;
   wherein said transparent glass reinforced polymer composite comprises a first composite layer, and wherein the step of binding comprises applying a binding agent to opposite surfaces of said first composite layer and sandwiching it between a plurality of glass layers.

2. The method of claim 1 wherein each of said plurality of glass layers has a thickness of between about 1 and about 6 mm, and wherein said transparent glass reinforced polymer composite has a thickness of between about 1 and about 3 mm.

3. The method of claim 1 and further including the steps of:
  making additional glass reinforced polymer composite layers;
  binding at least one of said additional glass reinforced polymer composite layer to one of said plurality of glass layers; and,
  binding an additional glass layer on said at least one additional glass reinforced polymer composite layer wherein the resulting laminate includes a plurality of said glass reinforced polymer composite layers alternately stacked with a plurality of said glass layers.

4. A method for making a laminate including at least a glass layer and a transparent composite comprising the steps of:
  making at least one transparent glass reinforced polymer composite through steps comprising:
  combining a refractive index modifier with a polymer precursor solution;
  combining glass with said precursor solution to result in a glass concentration of between about 10% and 50% by volume; and,
  curing said precursor solution to create a transparent glass reinforced polymer composite; and,
  binding a glass layer to said transparent glass reinforced polymer composite to form the laminate, said glass layer having a refractive index substantially equal to the refractive index of said glass with said precursor solution;
  wherein said transparent glass reinforced polymer composite comprises a first composite layer, and wherein the step of binding a glass layer to said first composite layer comprises applying a binding agent on said first composite layer to bind said glass layer to said first composite layer at room temperature and pressure.

5. A method for making a laminate including at least a glass layer and a transparent composite comprising the steps of:
  making at least one transparent glass reinforced polymer composite through steps comprising:
  combining a refractive index modifier with a polymer precursor solution;
  combining glass with said precursor solution to result in a glass concentration of between about 10% and 50% by volume; and,
  curing said precursor solution to create a transparent glass reinforced polymer composite; and
  binding a glass layer to said transparent glass reinforced polymer composite to form the laminate, said glass layer having a refractive index substantially equal to the refractive index of said glass with said precursor solution;
  wherein said refractive index modifier comprises nanoparticles having a refractive index that is less than that of said precursor solution whereby the refractive index of the precursor solution is lowered through addition of said nanoparticles.

6. A method for making a laminate including at least a glass layer and a transparent composite comprising the steps of:
  making at least one transparent glass reinforced polymer composite through steps comprising:
  combining a refractive index modifier with a polymer precursor solution;
  combining glass with said precursor solution to result in a glass concentration of between about 10% and 50% by volume; and
  curing said precursor solution to create a transparent glass reinforced polymer composite; and,
  binding a glass layer to said transparent glass reinforced polymer composite to form the laminate, said glass layer having a refractive index substantially equal to the refractive index of said glass with said precursor solution;
  wherein said refractive index modifier comprises nanoparticles having a diameter that is between about 100 nm and about 200 nm.

7. A method for making a laminate including at least a glass layer and a transparent composite comprising the steps of:
  making at least one transparent glass reinforced polymer composite through steps comprising:
  combining a refractive index modifier with a polymer precursor solution;
  combining glass with said precursor solution to result in a glass concentration of between about 10% and 50% by volume; and,
  curing said precursor solution to create a transparent glass reinforced polymer composite; and,
  binding a glass layer to said transparent glass reinforced polymer composite to form the laminate, said glass layer having a refractive index substantially equal to the refractive index of said glass with said precursor solution;
  wherein said refractive index modifier comprises ceramic nanoparticles.

8. A method for making a laminate including at least a glass layer and a transparent composite comprising the steps of:
  making at least one transparent glass reinforced polymer composite through steps comprising:
  combining a refractive index modifier with a polymer precursor solution;
  combining glass with said precursor solution to result in a glass concentration of between about 10% and 50% by volume; and,
  curing said precursor solution to create a transparent glass reinforced polymer composite; and,
  binding a glass layer to said transparent glass reinforced polymer composite to form the laminate, said glass layer having a refractive index substantially equal to the refractive index of said glass with said precursor solution;
  wherein said refractive index modifier comprises ceramic nanoparticles having a diameter of between about 50 nm and about 200 nm, and having a refractive index that is less than that of said precursor solution whereby the refractive index of the precursor solution is lowered through addition of said nanoparticles.

* * * * *

UNITED STATES PATENT AND TRADEMARK OFFICE
CERTIFICATE OF CORRECTION

| | | Page 1 of 1 |
|---|---|---|
| PATENT NO. | : 7,819,997 B2 | |
| APPLICATION NO. | : 10/943335 | |
| DATED | : October 26, 2010 | |
| INVENTOR(S) | : Khanna | |

It is certified that error appears in the above-identified patent and that said Letters Patent is hereby corrected as shown below:

In the Specification:

Col. 1, line 54    Please delete "that: of glass" and insert --that of glass-- therefor.

Signed and Sealed this
Third Day of May, 2011

David J. Kappos
*Director of the United States Patent and Trademark Office*